(12) United States Patent
Pingree

(10) Patent No.: US 10,870,388 B2
(45) Date of Patent: Dec. 22, 2020

(54) SIGNALING DEVICE

(71) Applicant: COSMO CONNECTED, Paris (FR)

(72) Inventor: Charles Pingree, Paris (FR)

(73) Assignee: COSMO CONNECTED, Paris (FR)

( * ) Notice: Subject to any disclaimer, the term of this patent is extended or adjusted under 35 U.S.C. 154(b) by 167 days.

(21) Appl. No.: 15/779,734

(22) PCT Filed: Nov. 30, 2016

(86) PCT No.: PCT/EP2016/079239
§ 371 (c)(1),
(2) Date: May 29, 2018

(87) PCT Pub. No.: WO2017/093293
PCT Pub. Date: Jun. 8, 2017

(65) Prior Publication Data
US 2020/0139880 A1 May 7, 2020

(30) Foreign Application Priority Data
Nov. 30, 2015 (FR) ..................................... 15 61620

(51) Int. Cl.
*B60Q 1/10* (2006.01)
*B60Q 1/26* (2006.01)
(Continued)

(52) U.S. Cl.
CPC .......... *B60Q 1/2676* (2013.01); *A42B 3/0453* (2013.01); *B60Q 1/447* (2013.01); *B60Q 2900/30* (2013.01)

(58) Field of Classification Search
CPC .. B60Q 1/2676; B60Q 1/447; B60Q 2900/30; A42B 3/0453
(Continued)

(56) References Cited

U.S. PATENT DOCUMENTS

2002/0121968 A1* 9/2002 Smith ...................... B60Q 1/44
340/425.5
2004/0008106 A1 1/2004 Konczal
(Continued)

FOREIGN PATENT DOCUMENTS

| DE | 3906726 |   | 9/1990 |   |
|----|---------|---|--------|---|
| FR | 2925874 |   | 7/2009 |   |
| FR | 2925874 | A1 * | 7/2009 | ............. A63C 17/26 |

OTHER PUBLICATIONS

Int'l Search Report issued in App. No. PCT/EP2016/079239 (dated 2017).

*Primary Examiner* — Tanmay K Shah
(74) *Attorney, Agent, or Firm* — Barnes & Thornburg LLP

(57) ABSTRACT

A signaling device intended to be worn by a moving user such as a rider of a two-wheel vehicle providing improved visibility on the part of other road users through the provision of a light source at a greater height than is conventional for such vehicles comprises an accelerometer taking measurements along three orthogonal axes, a rechargeable battery pack, a first light source, wireless communication means for transmitting an alert signal and a control unit which activates the light source above a particular deceleration or braking threshold, activates the communication means at a higher deceleration or accident threshold and activates the communication means when a number of switchovers between acceleration and deceleration is equal to or higher than a third threshold.

13 Claims, 1 Drawing Sheet

(51) Int. Cl.
*A42B 3/04* (2006.01)
*B60Q 1/44* (2006.01)

(58) Field of Classification Search
USPC .................................................. 340/425.5
See application file for complete search history.

(56) References Cited

U.S. PATENT DOCUMENTS

| | | |
|---|---|---|
| 2005/0134439 A1 | 6/2005 | Moore et al. |
| 2007/0063831 A1 | 3/2007 | Perkins et al. |
| 2014/0063790 A1* | 3/2014 | Gold .................. A42B 3/044 362/106 |
| 2014/0098524 A1 | 4/2014 | Liao |
| 2016/0091188 A1* | 3/2016 | Milligan ............. F21V 23/0492 362/105 |

* cited by examiner

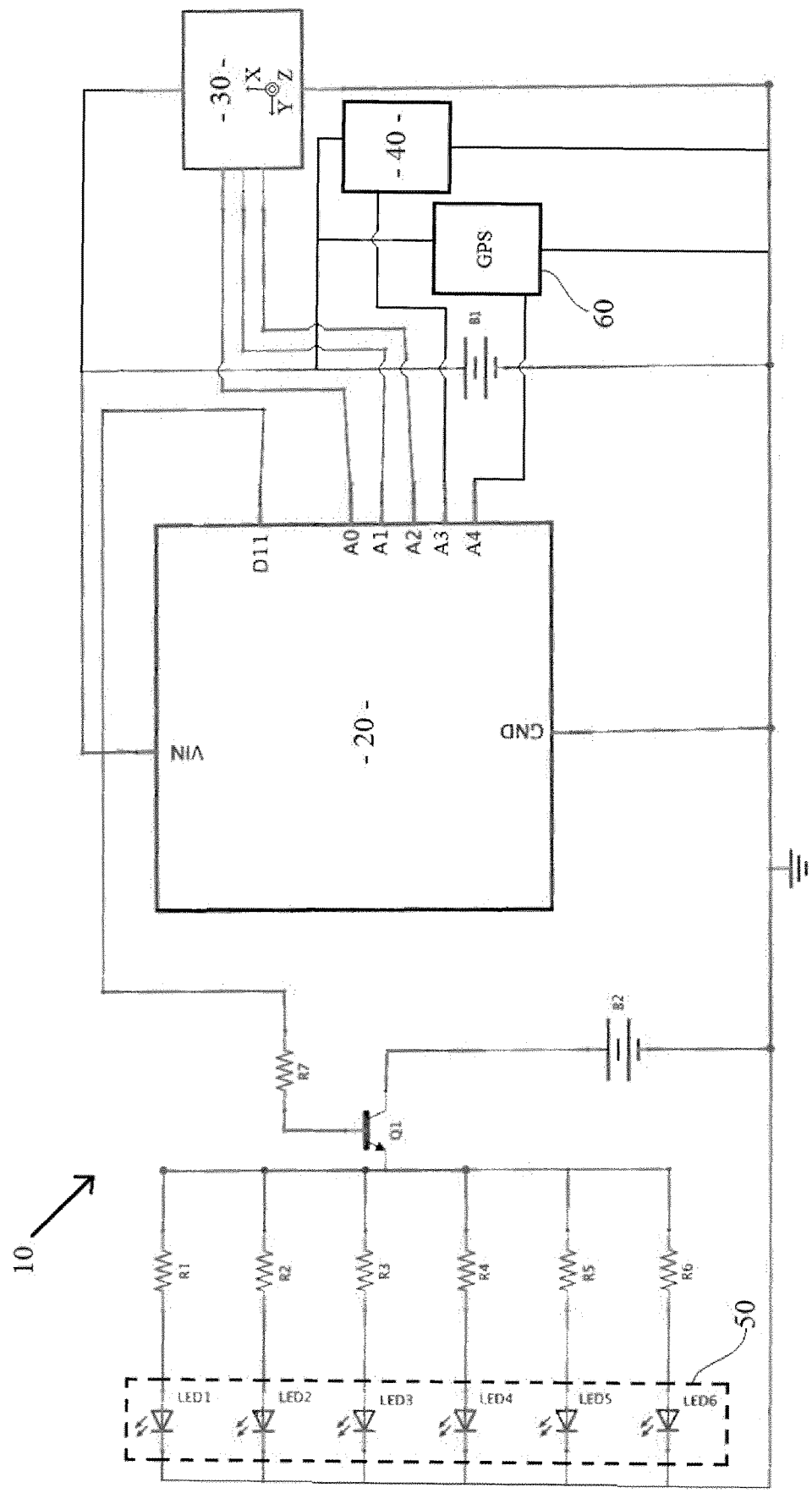

SIGNALING DEVICE

CROSS REFERENCE TO RELATED APPLICATIONS

This application is a U.S. nationalization under 35 U.S.C. § 371 of International Application No. PCT/EP2016/079239, filed 30 Nov. 2016, which claims priority to French Patent Application No. 1561620, filed 30 Nov. 2015. The disclosures set forth in the referenced applications are incorporated herein by reference in their entireties.

FIELD OF THE INVENTION

The technical field of the present invention pertains to signaling devices. The present invention finds application in particular in roadway signaling devices intended to be worn by a driver of a land vehicle, preferably a two-wheel vehicle. More generally, the invention is directed relates to any field of user activity wherein this user is in movement as is the case for example when practicing cycling, skiing but also an activity on a building site in particular when this user wears a protective helmet.

BACKGROUND OF THE INVENTION

In the state of the art in the particular case of roadway signaling devices, light signaling devices are known that are a function of braking of a vehicle.

These devices allow brake lights to light up in variable manner as a function of the level of braking determined by an accelerometer included in the light source.

However, to limit the number and the seriousness of accidents, it would be particularly desirable that drivers of two-wheel vehicles should be more visible having a light source at a higher height from the ground than the lights of said vehicles, as is the case for the third brake light arranged on the rear windscreen of three- or four-wheel vehicles.

As a result, first the drivers of two-wheel vehicles would be visible through a motor vehicle positioned between an observer and said brake light if equipped therewith, and secondly the distance separating said observer from said driver would be better assessed by said observer. It has been proven that the human eye better evaluates the distance separating the eye from an object comprising several lights than the distance from an object only comprising one light.

In addition, the above devices are not adapted to emit a different signal from the braking signal in the event of an accident, which may be detrimental to the physical integrity of the driver provided with said device.

In general, in any field of activity in which a user is in movement, in particular when this user wears a protective helmet, there is a true need for an improved signaling device which in particular solves the above-mentioned technical problems.

SUMMARY OF THE INVENTION

For this purpose, the present invention provides a signaling device intended to be worn by a user in movement, in particular a driver of a land vehicle, said device comprising an electronic accelerometer taking measurements along three orthogonal axes, an array of electrochemical rechargeable batteries, a first light source, wireless communication means arranged to transmit an alert signal and a control unit arranged to activate:

said light source when said accelerometer measures deceleration equal to or higher than a first predefined deceleration threshold, called braking threshold, and said communication means, when the accelerometer measures deceleration equal to or higher than a second predefined deceleration threshold, called accident threshold, said communication means when said accelerometer measures a number of switchovers between acceleration and deceleration equal to or higher than a third predefined threshold of number of switchovers within a predefined lapse of time.

By means of these provisions, first a driver equipped with the device of the invention is more visible when braking and secondly other drivers, emergency services and optionally relatives of said driver are immediately alerted in the event of an accident.

In addition, activation of the communication means is dependent on an additional parameter (number of switchovers between acceleration and deceleration within a predefined lapse of time) which improves the efficacy of the device according to the invention.

According to particular characteristics, this device further comprises a geolocating system arranged to measure the geographical coordinates of said device, the alert signal transmitted by the wireless communication means containing said geographical coordinates.

With these provisions, a driver victim of an accident is precisely located and can therefore be given faster emergency care.

According to other particular characteristics, this device further comprises a second light source, the control unit being further arranged to activate said second light source when said accelerometer measures deceleration equal to or higher than the second predefined deceleration threshold.

With these provisions, this second light source e.g. of orange color is able to flash meeting the function of a hazard warning light.

According to still other particular characteristics of this device, the control unit is further arranged to activate the second light source when the accelerometer measures a number of switchovers between acceleration and deceleration that is equal to or higher than the third predefined threshold of number of switchovers, within the predefined lapse of time.

With these provisions the activation of the second light source is also dependent on an additional parameter mentioned above, thereby further improving the efficacy of the device according to the invention.

According to still other particular characteristics, this device further comprises a photodiode and a third light source, the control unit further being arranged to activate said third light source when said photodiode measures optical radiation equal to or lower than a predefined threshold of optical radiation.

By means of these provisions, this third light source can meet the function of a sidelight.

According to still other particular characteristics of this device:

the first predefined deceleration threshold is between 0.2 and 2 $m/s^2$, preferably substantially equal to 1.96 $m/s^2$, and the second predefined deceleration threshold is approximately 20 $m/s^2$.

Also, preferably, the third predefined switchover threshold is approximately 3 and the predefined lapse of time is approximately 3 seconds.

The applicant has determined that these provisions are optimal. It is pointed out that the deceleration values are absolute values.

According to still other particular characteristics, the control unit is configured to adapt the first and/or second and/or third thresholds as a function of the speed of movement of the device.

It is therefore possible to change the value of the different thresholds as a function of the speed and hence to increase this value when needed.

To measure the speed of movement of the device, the control unit can be configured to integrate the acceleration value measured by the accelerometer.

According to still other particular characteristics this device further comprises:
- a flexible concave surface arranged to come into contact with a helmet on which said device is arranged to be attached, and
- a convex surface through which the light source is arranged.

By means of these arrangements, the device of the invention follows the contour of the helmet and is of aerodynamic shape.

According to still other particular characteristics of this device, the array of electrochemical rechargeable batteries can be recharged via a USB port.

With these arrangements, the use of the device of the invention is facilitated.

A further subject of the invention is an accessory intended to be worn by a user in movement, in particular a driver of a land vehicle, said helmet and said accessory comprising said signaling device. This accessory can be a helmet or a jacket.

The advantages related to this helmet and this accessory being similar to those of the device according to the invention, they will not be repeated here.

Other characteristics and advantages of the invention will become apparent on reading the following description of a preferred embodiment of the invention given as an example and with reference to the appended drawing.

BRIEF DESCRIPTION OF THE DRAWINGS

FIG. 1 shows an example of an electronic circuit diagram of a signaling device according to the invention.

DESCRIPTION OF PREFERRED EMBODIMENTS

In the description below, the indicated number values although non-limiting proved to give the most advantageous test results.

FIG. 1 schematically illustrates an example of embodiment of an electronic circuit of a signaling device 10 according to the invention.

The device 10 is intended to be worn by a driver of a land vehicle in particular a two-wheel vehicle intended to be driven on a road, typically a motorbike or bicycle.

Typically, the device 10 can be attached to or integrated into the rear of a helmet, jacket, backpack or any other accessory intended to be worn by a driver of a vehicle. Preferably, this circuit is grounded i.e. onto the accessory on or in which it is attached or integrated.

The device 10 comprises an accelerometer 30, at least one and here two electrochemical rechargeable batteries B1 and B2, a first light source 50 here formed of six LEDs (LED1-LED6) and/or OLEDS, wireless communication means 40 arranged to transmit an alert signal, and a control unit 20. In one variant, the light source is formed of a plurality of LEDs and/or OLEDS e.g. eight, preferably 12 but it can also be composed of approximately one hundred LEDs and/or OLEDs.

Typically, this light source 50 is of normalized color i.e. red.

In another variant, the light source is composed of a luminous screen.

Preferably, the batteries B1 and B2 are each of nominal voltage approximately 3.7 volts.

In the example, the wireless communication means 40 are connected to an input A3 of the control unit 20.

In the example, battery B1 is connected via a transistor Q1 and six resistances R1, R2, R3, R4, R5 and R6 to the six LEDs (LED1-LED6) of the light source 50 for electrical powering thereof.

Preferably the resistances R1, R2, R3, R4, R5 and R6 are approximately 68 ohms.

In the example, an output D11 of the control unit 20 is connected via a resistance R7, the transistor Q1 and the six resistances R1, R2, R3, R4, R5 and R6 to the six LEDs (LED1-LED 6) of the light source 50.

Preferably, the resistance R7 is approximately 150 ohms.

In the example, the battery B2 is connected to an input VIN of the control unit 20, to the wireless communication means 40 and to the accelerometer 30 for electrical powering thereof.

The control unit 20 is arranged to activate the light source 50 when the accelerometer 30 measures deceleration equal to or higher than a first predefined deceleration threshold called braking threshold.

In addition, the control unit 20 is arranged to activate the wireless communication means 40 when the accelerometer 30 measures deceleration equal to or higher than a second predefined deceleration threshold, called accident threshold.

In one example, the communication means 40 transmit the alert signal via a telecommunications network e.g. GSM. Therefore, the emergency services and optionally at least one relative of the driver are alerted as soon as the device 10 suffers an impact i.e. said driver is the victim of an accident.

In one variant, the communication means 40 transmit the alert signal via a dedicated application of the driver's mobile phone. In this case, the communication means 40 operate via Wi-Fi (Wireless Fidelity), Bluetooth or Near Field Communication (NFC), etc.

Therefore, directly or via a dedicated application implanted in a driver's mobile device such as a mobile phone, this driver can be linked to a dedicated remote platform. This remote platform particularly allows alerting of the emergency services on receiving an alert signal transmitted by the communication means 40 and broadcast via a telecommunications network such as explained above. It can also enable users to remain in contact with one another to form a community for exchange of information and experiences. Typically, the control unit 20 is of processor, microcontroller, PLD (programmable logic device), FPGA (field-programmable gate array), EPLD (erasable programmable logic device), CPLD (complex programmable logic device), PAL (programmable array logic) or PLA type (programmable logic array).

Preferably, the device 10 further comprises a geolocating system 60 of the GPS (Global Positioning System) type for example arranged to measure the geographical coordinates of said device, the alert signal containing said geographical coordinates.

In the example, the battery B2 is connected to the geolocating system 60 which itself is connected to an input A4 of the control unit 20.

In one example, the device 10 comprises a second light source (not illustrated in FIG. 1). The control unit 20 is then further arranged to activate this second light source when the accelerometer 30 measures deceleration equal to or higher than the second predefined deceleration threshold. In this case, the second light source is preferably of orange color and operates by flashing.

The accelerometer 30 is electronic and takes measurements along three orthogonal axes X, Y and Z. In this case, the accelerometer 30 comprises an output to communicate the measurements of each axis X, Y and Z, each of the outputs being connected via a wire connection to a separate input A0, A1 and A2 respectively of the control unit 20.

The control unit 20 is further arranged to activate the communication means 40 and/or the second light source when the accelerometer 30, along at least one of the axes X, Y and Z, measures a number of switchovers between acceleration and deceleration equal to or higher than a third predefined threshold of number of switchovers within a predefined lapse of time.

In one example, this threshold of number of switchovers is 3 and this predefined lapse of time is 3 seconds.

In one example, the device 10 further comprises a photodiode and a third light source (not illustrated in FIG. 1). The control unit 20 is then further arranged to activate this third light source when this photodiode measures optical radiation equal to or lower than a predefined optical radiation threshold i.e. when outside luminosity becomes low.

In this case, this third light source would be of red color and meet the function of a sidelight.

In one example, the device 10 further comprises a fourth light source and a fog or mist detector (not illustrated in FIG. 1). The control unit 20 is then further arranged to activate this fourth light source when this detector measures hygrometry equal to or higher than a predefined hygrometry threshold i.e. when air humidity becomes high.

In this case, this fourth light source would be red color and meet the function of a fog light. For this purpose, this fourth light source would be more powerful than the others which are preferably configured to be visible by an observer 50 meters distant in daylight and 150 meters distant at night.

Preferably the first predefined deceleration threshold is between 0.2 and 2 $m/s^2$, preferably substantially equal to 1.96 $m/s^2$, and the second predefined deceleration threshold is approximately 20 $m/s^2$.

It is possible to provide that the first, second and third predefined thresholds, or at least one thereof, can be adapted as a function of the speed. In this case, the control unit 20 is configured to adapt the threshold(s) under consideration to the speed of movement of the device.

This adaptive nature of one of at least one of the thresholds allows the value of this threshold to be changed as a function of the speed. For example, if speed increases it is possible to provide for an increase in the first threshold so that the first light source 50 is only activated on and after a higher deceleration value than is the case at a lower speed.

To measure the speed of movement of the device, the control unit 20 is configured to integrate the acceleration value measured by the accelerometer 30. This speed value thus determined can optionally be validated via a gyroscope integrated in the device.

If the device 10 is attached to a helmet, said device also comprises a flexible concave surface (not illustrated in FIG. 1) arranged to come into contact with said helmet, and a convex surface (not illustrated in FIG. 1) through which the light source(s) 50 are arranged.

Preferably, the device 10 is removably attached to the accessory worn by the driver of the land vehicle.

In one example, the flexible element is made in rubber or any other natural and/or synthetic elastic material, Preferably the electrochemical rechargeable batteries B1 and B2 are rechargeable via a USB port and in one example said batteries of a lithium-ion polymer type.

Preferably, the device 10 comprises an indicator of its charge status (not illustrated in FIG. 1) which is:
  either binary if said charge status is defined as being sufficient or insufficient,
  or graduated if said charge status is defined as being a level of absolute charge.

Obviously, the present invention is not limited to the examples and embodiments described and illustrated but can be given numerous variants within the reach of persons skilled in the art. In particular, the invention is not limited to a device intended to be worn by a driver of a land vehicle such as a motorbike but extends to a device intended to be worn by a user in movement. In addition, the invention is not limited to integration of the device in an accessory such as a protective helmet e.g. for practicing motorcycling, skiing or for protection on a building site, but extends to integration of the device in any accessory able to be worn by a user in movement such as a jacket or backpack.

The invention claimed is:

1. A signaling device intended to be worn by a user in movement, in particular a driver of a land vehicle, said device comprising an electronic accelerometer taking measurements along three orthogonal axes, an array of electrochemical rechargeable batteries, a first light source, wireless communication means intended to transmit an alert signal and a control unit intended to activate:
  said light source when said accelerometer measures deceleration equal to or higher than a first predefined deceleration threshold, called braking threshold, and
  said communication means when said accelerometer measures deceleration equal to or higher than a second predefined deceleration threshold, called accident threshold,
  wherein the control unit is further intended to activate the communication means when said accelerometer measures a number of switchovers between acceleration and deceleration equal to or higher than a third predefined threshold of number of switchovers within a predefined lapse of time.

2. The device according to claim 1, wherein it further comprises a geolocating system arranged to measure the geographical coordinates of said device, the alert signal transmitted by the wireless communication means containing said geographical coordinates.

3. The device according to claim 1, wherein it further comprises a second light source, the control unit being further arranged to activate said second light source when the accelerometer measures deceleration equal to or higher than the second predefined deceleration threshold.

4. The device according to claim 3, wherein the control unit is further arranged to activate the second light source when said accelerometer measures a number of switchovers between acceleration and deceleration equal to or higher than the third predefined threshold of number of switchovers within the predefined lapse of time.

5. The device according to claim 1, wherein it further comprises a photodiode and a third light source, the control unit being further arranged to activate said third light source when said photodiode measures optical radiation equal to or lower than a predefined optical radiation threshold.

6. The device according to claim 1, wherein:
the first predefined deceleration threshold is between 0.2 and 2 m/s$^2$, preferably substantially equal to 1.96 m/s$^2$, and
the second predefined deceleration threshold is approximately 20 m/s$^2$.

7. The device according to claim 1, wherein the third predefined threshold is approximately equal to 3 and the predefined lapse of time is approximately 3 seconds.

8. The device according to claim 1, wherein the control unit is configured to adapt the first and/or second and/or third thresholds as a function of the speed of movement of the device.

9. The device according to claim 7, wherein the control unit is configured to measure the speed of movement of the device by integrating the acceleration value measured by the accelerometer.

10. The device according to claim 1, wherein it further comprises:
a flexible concave surface intended to come into contact with a helmet on which said device is intended to be attached, and
a convex surface through which the light source is arranged.

11. The device according to claim 1, wherein the array of electrochemical rechargeable batteries is rechargeable via a USB port.

12. An accessory intended to be worn by a user in movement, in particular a driver of a land vehicle, said accessory comprising a signaling device according to claim 1.

13. The accessory according to claim 12, said accessory being a helmet, jacket or backpack.

* * * * *